A. W. HALL.
Device for Moving Churn Dashers.
No. 46,970. Patented March 21, 1865.
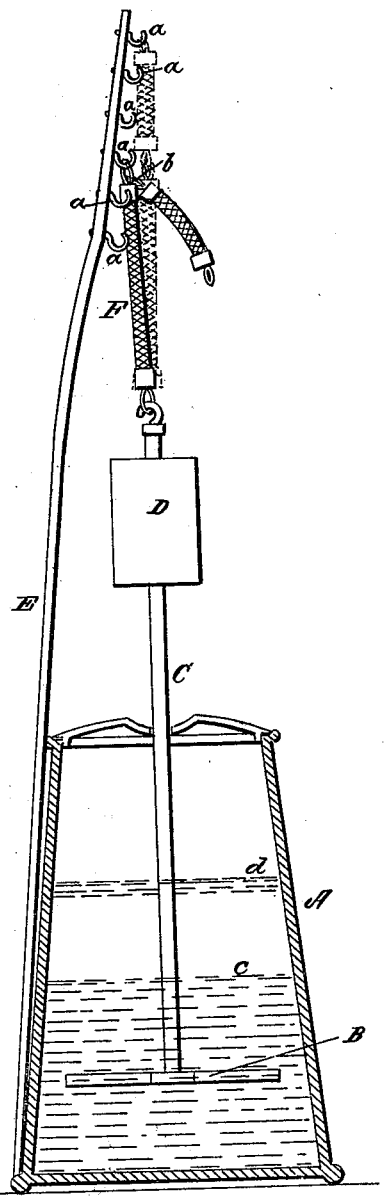

UNITED STATES PATENT OFFICE.

A. W. HALL, OF NEW YORK, N. Y., ASSIGNOR TO BENJAMIN W. ROBINSON, OF SOUTH READING, MASSACHUSETTS, AND CHARLES M. CLARK, OF BROOKLYN, NEW YORK.

DEVICE FOR MOVING CHURN-DASHERS.

Specification forming part of Letters Patent No. 46,970, dated March 21, 1865.

*To all whom it may concern:*

Be it known that I, A. W. HALL, of the city, county, and State of New York, have invented a new and Improved Churn; and I do hereby declare that the following is a full, clear, and exact description thereof, which will enable others skilled in the art to make and use the same, reference being had to the accompanying drawing, forming part of this specification, said drawing representing a vertical central section of a churn having my improvement applied to it.

This invention relates to an improvement in the old class of churns, which are provided with an up and down or a rising and falling dasher.

The invention consists in the novel application of a spring to the dasher, whereby the operation of churning is greatly facilitated and the spring rendered capable of being adjusted and graduated according to the quantity of the cream in the churn and the length of stroke required for the dasher, as hereinafter fully set forth.

A represents the body of a churn, which may be constructed in any of the forms now manufactured for up and down or rising and falling dashers.

B is the dasher, which may be also constructed in the usual way. The rod C of the dasher has a weight, D, placed upon it.

E is a standard, which is secured to the exterior of the churn-body A, and projects some distance above it, and has a series of hooks, $a$, attached at suitable distances apart. To the upper end of the dasher-rod C there is attached a spring, F, which may be of wire bent in spiral form, or of india-rubber, or other proper elastic material. This spring has one or more rings, $b$, attached to it, any one of which may be fitted on any one of the hooks $a$. The strength of the spring F should be such that it will be capable of elevating the dasher through the cream, and by means of the rings $b$ the spring may be virtually lengthened or shortened, according to the length of stroke it is necessary for the dasher to have, which of course is equivalent to the height of the cream in the churn-body. Suppose, for instance, that the cream in the churn extends as high as C, and that the ring $b$ requires to be fitted on the second hook $a$ from the bottom, in order to admit of the dasher having the requisite length of stroke—that is to say, the spring, under this adjustment, to be capable of raising the dasher to the top of the cream; then, if additional cream be added, so that it will reach as high as $d$, the whole spring will require to be used, its top ring fitted on the uppermost hook $a$. This increased length of the spring admits of the dasher being elevated from the bottom of the churn to the top of the cream without any undue tension of the spring. If the spring could not be virtually lengthened and shortened according to the quantity of cream in the churn, and the placing or suspending of the spring on the different hooks $a$ alone depended on for regulating the stroke of the dasher, additional effort would be required in long strokes of the dasher, and the spring would be liable to be injured by undue tension. But it will be seen that by suspending the spring on different hooks $a$, higher or lower, according to the height of the cream in the churn, and varying the length of the spring according to the length of the stroke the dasher is required to have, I at all times can obtain a proper length of stroke, with a spring proportionate in capacity to said stroke, although the same result may be imperfectly obtained by either the adjustment of a spring of the same length on hooks of different heights, or by lengthening or shortening a spring from one and the same hook or point of suspension; but the adjusting of the spring at different lengths, and the lengthening or shortening of the same, is the only perfect and truly practicable plan, as the cream varies in density from the beginning to the end of the operation of churning, and by shortening the spring, and consequently increasing its strength as the labor of the dasher increases, the churning process is greatly facilitated. The weight D is used to give momentum to the dasher and insure an easy vibration thereof.

Having thus described my invention, I claim as new and desire to secure by Letters Patent—

1. The employment or use, in a churn provided with a rising and falling dasher, of a spring attached to the dasher-rod, and a plurality of hooks applied to any suitable fixture, to admit of the suspension of the spring at different lengths, substantially as and for the purpose specified.

2. The graduating of the spring or lengthening and shortening the same, in connection with one or more hooks or points of suspension, substantially as and for the purpose set forth.

A. W. HALL.

Witnesses:
H. N. MUNN,
THEO. TUSCH.